US011947915B1

(12) United States Patent
Shen et al.

(10) Patent No.: US 11,947,915 B1
(45) Date of Patent: Apr. 2, 2024

(54) SYSTEM FOR DETERMINING DOCUMENT PORTIONS THAT CORRESPOND TO QUERIES

(71) Applicant: TOWNSEND STREET LABS, INC., San Francisco, CA (US)

(72) Inventors: Chia-Hui Shen, Emeryville, CA (US); Suchit Agarwal, Jersey City, NJ (US); David Sung-Eun Lim, Los Angeles, CA (US); Pratyus Patnaik, Los Altos, CA (US); Pierre Rappolt, South Lake Tahoe, CA (US); Tanya Butani, Dublin, CA (US); William S. Potter, Truckee, CA (US)

( * ) Notice: Subject to any disclaimer, the term of this patent is extended or adjusted under 35 U.S.C. 154(b) by 287 days.

(21) Appl. No.: 17/302,118

(22) Filed: Apr. 23, 2021

(51) Int. Cl.
*G06F 40/30* (2020.01)
*G06F 16/338* (2019.01)
*G06F 40/166* (2020.01)
*G06F 40/247* (2020.01)
*G06F 40/279* (2020.01)

(52) U.S. Cl.
CPC .......... *G06F 40/30* (2020.01); *G06F 16/338* (2019.01); *G06F 40/166* (2020.01); *G06F 40/247* (2020.01); *G06F 40/279* (2020.01)

(58) Field of Classification Search
CPC ...... G06F 40/30; G06F 16/338; G06F 40/166; G06F 40/247; G06F 40/279
See application file for complete search history.

(56) References Cited

U.S. PATENT DOCUMENTS

| 2011/0258240 | A1* | 10/2011 | LeFever | G06F 16/30 |
| | | | | 707/812 |
| 2012/0123767 | A1* | 5/2012 | Ananthanarayanan | ........... |
| | | | | G06F 40/253 |
| | | | | 704/9 |
| 2021/0149962 | A1* | 5/2021 | Yin | G06F 16/5846 |
| 2021/0295822 | A1* | 9/2021 | Tomkins | G06F 16/90332 |
| 2022/0156298 | A1* | 5/2022 | Mahmoud | G06F 16/9535 |

* cited by examiner

*Primary Examiner* — Daniel C Washburn
*Assistant Examiner* — Paul J. Mueller
(74) *Attorney, Agent, or Firm* — Holland & Hart LLP

(57) ABSTRACT

A document is divided into sections based on a characteristic of the text in the document. Characteristics may include specific characters such as paragraph breaks or selected punctuation, the topics or categories of the text, or a quantity of text in each section. Each section of the document may be represented by an embedding vector in a semantic embedding space. Values are determined based on the text in each section and the semantic characteristics of each section, such as word order, capitalization, punctuation, and word meaning. When a query is received, a vector value representing the query is determined based on the text and semantic characteristics of the query. Based on the similarity between the values determined for the query and those determined for the sections of a document, the specific section of a potentially large document that most closely matches the query is determined and included in a response.

21 Claims, 6 Drawing Sheets

SYSTEM FOR DETERMINING DOCUMENT PORTIONS THAT CORRESPOND TO QUERIES

INCORPORATION BY REFERENCE

U.S. patent application Ser. No. 15/373,312, filed Dec. 8, 2016, now U.S. Pat. No. 10,685,047 is incorporated by reference herein in its entirety.

U.S. patent application Ser. No. 15/610,183, filed May 31, 2017, now U.S. Pat. No. 10,817,483, is incorporated by reference herein in its entirety.

U.S. patent application Ser. No. 15/942,342, filed on Mar. 30, 2018, now U.S. Pat. No. 10,795,886, is incorporated by reference herein in its entirety.

U.S. patent application Ser. No. 16/521,244, filed Jul. 24, 2019, is incorporated by reference herein in its entirety.

U.S. patent application Ser. No. 16/584,742, filed Sep. 26, 2019, is incorporated by reference herein in its entirety.

U.S. patent application Ser. No. 17/060,379, filed Oct. 1, 2020, is incorporated by reference herein in its entirety.

U.S. patent application Ser. No. 17/075,499, filed Oct. 20, 2020, is incorporated by reference herein in its entirety.

U.S. patent application Ser. No. 17/169,256, filed Feb. 5, 2021, is incorporated by reference herein in its entirety.

BACKGROUND

Individuals affiliated with a company or other organization may submit a query for assistance or information. Organizations may maintain documents or other repositories of information, which may be provided in response to a query by a human operator or using an automated system. Determining the most relevant document or portion of a document for inclusion in a response may be difficult if multiple documents include text similar to the text of a query, or if one or more of the documents is particularly large.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
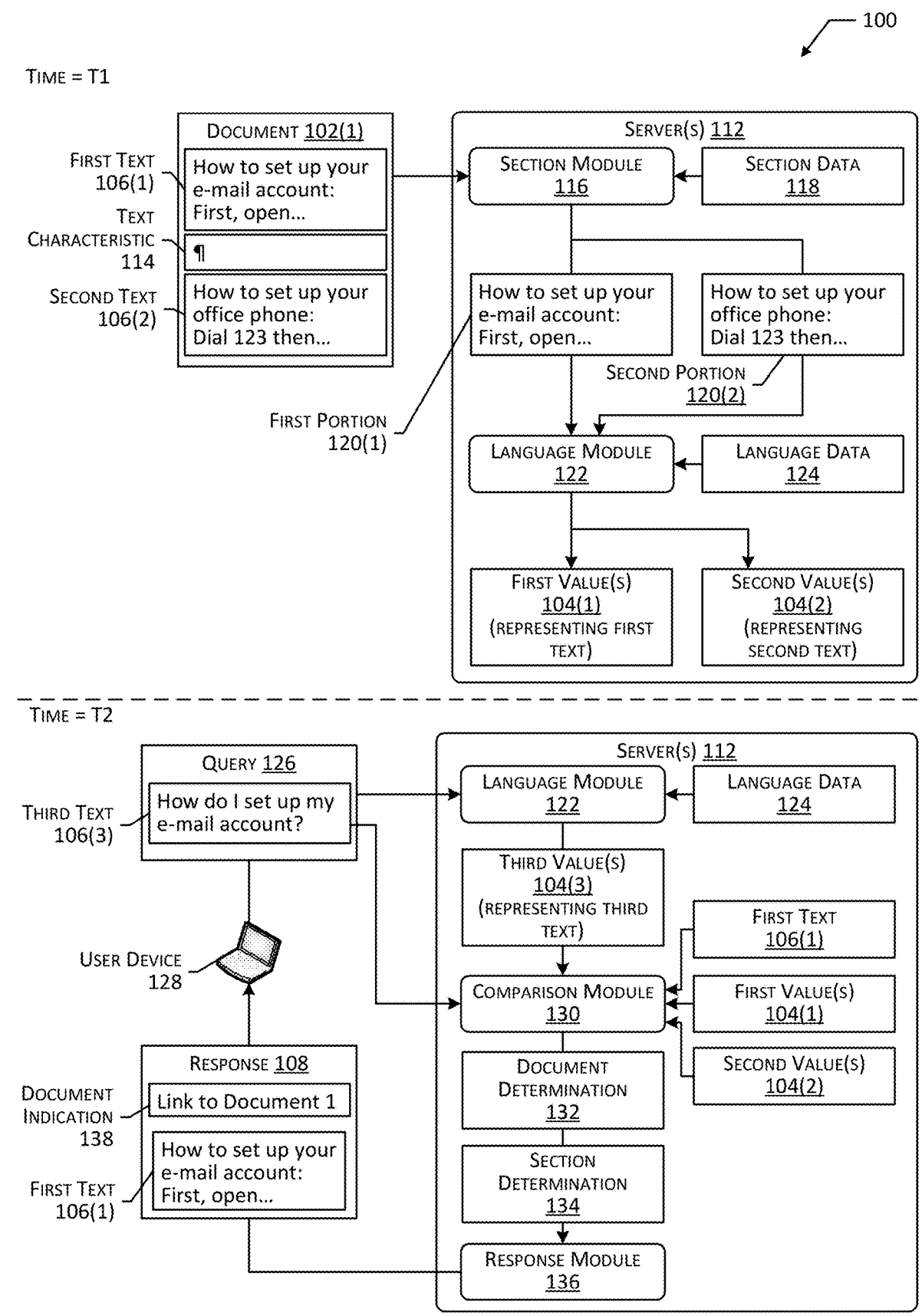
FIG. 1 is a diagram depicting an implementation of a system for dividing a document into sections, determining sets of values that represent the text and semantic characteristics of the sections, and determining a response to a query that includes the text of a relevant section of a document.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Companies and other types of organizations may process queries, such as requests for information, assistance, equipment, software, and so forth, using various types of systems, such as a ticketing system. In some cases, such a system may be at least partially automated. For example, natural language processing or other types of analysis may be used to determine terms or other parameters of a query. Based on the parameters of a query, an automated system may determine an appropriate response, or the query may be provided to a particular agent or other user, group of users, department, and so forth based on the determined parameters of the query. For example, a user employed by a company may submit the query "What happens if my company laptop breaks?", and one or more documents having text that matches or is similar to one or more words in the query may be determined and presented in a response. However, in some cases, a large number of documents maintained by an organization may include text that appears relevant to a query. Additionally, in some cases, a lengthy document may include a portion that appears relevant to a query, while the remainder of the document does not appear relevant to the query. In such cases, a response that indicates the determined documents may not enable a user to quickly access the requested information. For example, the user may be required to access and read numerous potentially large documents before determining information that is responsive to the query.

Described in this disclosure are techniques for determining portions of one or more documents or other types of information that are responsive to a query. For example, a company or other organization may maintain multiple documents in a data store. The documents may include one or more of text, Hypertext Markup Language (HTML), Extensible Markup Language (XML), Portable Document Format (PDF) files, images, audio data, video data, and so forth. An automated system may receive queries from users and may determine a response that indicates one or more documents that may be relevant to the query, as well as particular portions of the document(s) that may be relevant. For example, in response to the query "What happens if my company laptop breaks?", a large document titled "Company Equipment Policies" may include a single section titled "Laptop trade in policy" that includes text that is relevant to the query, while the remainder of the document may be irrelevant with regard to the query. A user may be required to navigate through a large amount of information if provided with a response that identifies the large document but does not direct the user to the relevant section. Additionally, in cases where multiple documents may include text that is relevant to a query, determining information that is more closely relevant to the query than other information and prioritizing use of this information in a response may enable the user to navigate through a smaller number of documents before determining relevant information. Techniques described herein may be used to determine one or more documents that are relevant to a query, and the specific portions of the document(s) that most closely correspond to the text of the query, which may be provided in a response. In some cases, the determined portions of the document(s) may be provided in an interface that does not require the user to navigate to the remainder of a document, such as by presenting text from a relevant portion of the document in a display area.

To facilitate determination of portions of a document that correspond to a received query, a document may be divided into sections. For example, a document may include text. The text may have semantic characteristics. Semantic characteristics may include syntactic characteristics, such as an arrangement of words within the text, characters that represent punctuation, characters that represent numerals, characters that represent capitalization, and so forth. For example, the order in which words appear in a sentence may affect the meaning of the sentence and the manner in which the sentence is interpreted. As another example, the presence of capital letters may indicate proper nouns, acronyms, abbreviations, and so forth. Semantic characteristics may also include meanings associated with words. As such, both the text of the document and the semantic characteristics may affect the meaning and interpretation of the document. The document may be divided into sections based on a characteristic of the text. For example, a first section may include a first portion of the text, having first semantic characteristics, and a second section may include a second portion of the text, having second semantic characteristics. A document may be divided into any number of sections in this manner, up to a selected threshold count of sections. For example, a threshold count of sections may include ten sections, and a document may be divided into any number of sections up to the threshold count based on characteristics of the text within the document.

In some implementations, characteristics of the text that may be used to divide a document into sections may include particular characters within the text. For example, characters that indicate paragraph breaks, spacing or blank lines, or bullet points may be used to determine sections of the document. Continuing the example, a first section may include text that occurs before the determined character while a second section includes text that occurs after the determined character. In some cases, characters that are used to divide a document into sections may include characters that are not associated with a display output, such as symbols indicating line breaks, page breaks, or paragraph breaks that are not displayed, markup language code that indicates a division between text or sections, and so forth. Correspondence between the text of a document and threshold characters that may be used to divide a document into sections may be used to determine the presence of such characters in a document.

In other implementations, characteristics of the text that may be used to divide a document into sections may include categories associated with the text. For example, one or more words of the first portion of the text may be analyzed using natural language processing or other types of analysis to determine a first category or topic associated with the first portion. One or more words of the second portion of the text may be analyzed to determine a second category. Based on a determination that the portions of the document include text associated with different categories or topics, the document may be divided such that a first section includes text associated with the first category and a second section includes text associated with the second category.

In still other implementations, characteristics of the text that may be used to divide a document into sections may include the amount of text within the document (e.g., the length of the document) and the amount of text within the sections. For example, a count of words, characters, or sentences associated with the text of the document may be determined. Additionally, a threshold count of words, characters, or sentences associated with a minimum, maximum, or target length of a section may be determined. Based on the threshold count and the count of words, sentences, or characters within the document, the document may be divided into sections. Each section may include a count of words, characters, or sentences less than a threshold maximum, greater than a threshold minimum, or within a threshold value of a target count. In some implementations, a document may be divided into sections based on the amount of text within the document or within the sections if other characteristics for dividing the document are not determined. For example, if a document includes particular characters within the text that may be used to divide the document, or if the document includes text associated with different categories, as described previously, the characters or categories may be used to divide the document into sections. However, if these characteristics for dividing the document are not determined, the amount of text within the document or within the sections may be used to divide the document.

For each section of the document, an embedding vector in a semantic embedding space, or other types of representations or values, may be determined. For example, tokens representing the text in a document section may be determined, and a vector representing the occurrence of the tokens, the arrangement of the tokens, and other semantic characteristics of the text within a section may be determined. Continuing the example, a vector determined based on a section of a document may indicate a point in an n-dimensional space that represents the text and semantic characteristics of the section. In some implementations, if a document is modified, such as through the addition or removal of text, the process of dividing the document into sections based on the characteristics of the modified text, then determining a vector or other types of representations or values for the sections, may be repeated. In some cases, this process may be repeated if at least a threshold portion of the document is modified, while in other cases, any modification to a document may cause the process to be repeated.

When a query is received from a user, specific sections of documents that correspond to the query may be determined. The query may include text, such as a question expressed in natural language, one or more keywords or other search terms, and so forth. In some implementations, an augmented query may be generated based on the received query and language data. For example, natural language processing techniques and language data indicative of particular weights applied to certain terms or semantic characteristics of the query, and synonyms of particular query terms, may be used to process the received query by removing or adding one or more words. A vector, or other types of representations or values, may then be determined based on the text and semantic characteristics of the query. For example, a vector may indicate a point in an n-dimensional space that represents the text and semantic characteristics of the query.

Based on the vector or other values that represent the query, one or more documents and sections of documents that correspond to the query may be determined. In some implementations, correspondence between the text of the query and the text of one or more documents may be used to determine a set of documents that may be relevant with regard to the query. For example, if a portion of the text within a document matches, partially matches, or represents a near match with the text of the query, this may indicate that the document is relevant with regard to the query. After determining a set of documents that are potentially relevant to the query, the vector or other values that represent the query may then be used to determine one or more sections of the documents that correspond to the text and semantic characteristics of the query. Specifically, if the vector or other values that represent the query are within a threshold similarity or threshold value of the vector or other values that represent a section of a document, this may indicate the section of the document contains a suitable response to the query. In such a case, a response may be determined that indicates the document and includes at least a portion of the text in the determined section of the document. For example, a section of a document may include a paragraph within the document. If the vector that represents the section of the document indicates a point within a threshold distance of a point indicated by the vector that represents the query, a response that includes a link to access the document and the text of the paragraph represented by the vector may be presented. In some implementations, user input may be used to access the document. For example, the document may be presented in response to user input to a link or selector associated with the document. In some implementations, a region of the user interface that includes at least a portion of the section of the document that was presented in the response may be presented in a display area after the user input is received.

In other implementations, a comparison between a vector or other values that represent a query and a vector or other values that represent sections of a document may be used to determine documents that are potentially relevant with regard to the query. For example, if the vector or other values that represent the query are within a threshold similarity or threshold value or the vector or other values that represent a section of a document, this may indicate the document is potentially relevant to the query, and that the section of the document may contain a suitable response to the query. In cases where multiple documents include sections having vectors or other representations within a threshold of the vector or other representation of the query, the text of the documents may be compared to that of the query to determine whether one or more documents are more likely to be relevant to the query. For example, in response to the query "What happens if my company laptop breaks?", a single paragraph of a first document titled "Company equipment policies" may be represented by a vector that is within a threshold of the vector that represents the query. However, a section of a second document titled "Company computer repair policies" may also be represented by a vector that is within a threshold of the vector that represents the query, and a larger portion of the text of the second document may more closely correspond to the text of the query than the text of the first document.

In other implementations, documents, sections of documents, or both documents and sections may be associated with user feedback. For example, if a document is presented in response to a query, a user may provide feedback indicating whether the document was useful for resolving the query. Positive or negative feedback from the user may be stored in association with an indication of the document. The feedback may also be stored in association with an indication of the parameters of the query, which may indicate particular types of queries for which the document may be useful or non-useful. Additionally, the feedback may be stored in association with an indication of the section of the document that was presented in a response. For example, a document may include a first section having useful information and a second section having information that has become outdated or otherwise has deprecated. In such a case, positive feedback may be associated with the first section and negative feedback may be associated with the second section. In cases where a vector that represents a query is within a threshold of a vector that represents the first section, the first section may be provided in a response. However, in cases where a vector that represents a query is within a threshold of a vector that represents the second section, a different document or section may be used in a response due to the negative feedback associated with the second section.

In some implementations, vectors or other representations determined for the sections of a document may be used to determine differences between the sections of the document and to provide notifications to administrators or owners of the document. For example, a vector or other set of values that represent the text and semantic characteristics of a first section of a document may be compared to a vector or other set of values that represent a second section of the document. If the vectors or other values for different sections of a document differ by at least a threshold difference, this may indicate that the different sections of the document relate to different categories of information, include different formats or other semantic characteristics, and so forth. For example, in such a case, a section may have been included in an unrelated document in error, or unrelated sections of a document may be more appropriately divided into different documents.

Division of documents into sections may enable relevant content to be determined in response to a query more efficiently than searching entire documents. For example, comparing the text of individual sections of documents to the text of a query may reduce latency and use a smaller quantity of computational resources than searching entire documents. Additionally, representation of sections of documents, and received queries, as vectors or as other types of values may enable sections of documents that correspond to received queries to be determined efficiently, with less latency and less use of computational resources, than use of the text of the documents and queries themselves. For example, computation of the distance between the points indicated by two vectors may be determined quickly, using only a small amount of computational resources. Determination of specific sections of a document that correspond to a query may also conserve time and computational resources, and improve user experiences, by presenting a user with text from a section that is likely to be relevant to a query in a response. As a result, additional time and resources associated with accessing and presenting an entire document may be avoided, and the user may avoid the need to review an entire document to locate a relevant section. Additionally, accurate presentation of information in response to a query may reduce the time and resources associated with subsequent queries, as a user attempts to locate relevant content through subsequent queries.

Illustrative System

FIG. 1 is a diagram 100 depicting an implementation of a system for dividing a document 102 into sections, determining sets of values 104 that represent the text 106 and semantic characteristics of the sections, and determining a response 108 to a query 126 that includes the text 106 of a relevant section of a document 102. At a first time T1, one or more servers 112 or other computing device(s) may access a first document 102(1). For example, the first document 102(1) may be stored in data storage accessible to the server(s) 112, sent to the server(s) 112 from another computing device, input to the server(s) 112 by a user, and so forth. The first document 102(1) may be associated with any format, including formats used by word processing software, document presentation software, and so forth. For example, the first document 102(1) may include text 106, Hypertext Markup Language (HTML), Extensible Markup Language (XML), Portable Document Format (PDF) files, and so forth. Additionally, in some implementations, the first document 102(1) may include one or more of image data, audio data, video data, or other types of data in addition to data representing text 106. Specifically, FIG. 1 depicts the first document 102(1) including first text 106(1) that includes instructions directing a user to set up an e-mail account, and second text 106(2) that includes instructions directing a user to set up an office phone. In FIG. 1, the depiction of the text 106 as first text 106(1) and second text 106(2) is conceptual, for illustrative purposes. In some implementations, the first document 102(1) may not include a visible or conceptual separation between the first text 106(1) and the second text 106(2).

The text 106 of the first document 102(1) may also include semantic characteristics. The semantic characteristics may include syntactic characteristics, such as an arrangement of words within the text 106, punctuation, characters that represent numerals or capitalization, and so forth. The semantic characteristics may also include meanings associated with words, synonyms, weight values associated with particular words, and so forth. In some implementations, the semantic characteristics may be associated with a display output, such as a visible section break, space, or character that is placed between different conceptual sections of the first document 102(1). In other implementations, semantic characteristics may not be associated with a display output. For example, conceptual sections of the first document 102(1) may be denoted using HTML code that does not cause an output. As one example, FIG. 1 depicts the first document 102(1) including a text characteristic 114 indicative of a paragraph break. The first text 106(1) may include the text 106 of the first document 102(1) that occurs before the text characteristic 114, while the second text 106(2) may include the text of the first document 102(1) that occurs after the text characteristic 114. Semantic characteristics of the first document 102(1), such as the text characteristic 114, may be used to divide the first document 102(1) into sections.

A section module 116 associated with the server(s) 112 may determine correspondence between the text 106 and text characteristics 114 of the first document 102(1) and section data 118. The section data 118 may indicate one or more threshold characters, which may include selected characters or groups of characters, code, or other text characteristics 114 that may be used to divide the first document 102(1) into sections. For example, the section data 118 may indicate that a paragraph break, an amount of space greater than a threshold amount, or a selected punctuation character may be used to divide a document 102 into sections. Based on the correspondence between the section data 118 and the text 106 of the first document 102(1), which is shown including a text characteristic 114 that may be indicated in the section data 118, text 106 that occurs before the text characteristic 114 may be included in a first section of the first document 102(1), while text that occurs after the text characteristic 114 may be included in a second section. Specifically, the section module 116 may determine a first portion 120(1) of the text 106 that includes the first text 106(1) and a second portion 120(2) of the text 106 that includes the second text 106(2). While FIG. 1 depicts determination of two sections of the first document 102(1), a document 102 may be divided into any number of sections. In some implementations, the section data 118 may include threshold data indicative of a minimum or maximum number of sections that may be determined for a document 102. For example, the section data 118 may include a priority value or hierarchy associated with one or more text characteristics 114, and in cases where division of a document 102 using each text characteristic 114 would result in the document 102 including a number of sections greater than a threshold maximum, the document 102 may be divided based on selected text characteristics 114 having a greater priority than other text characteristics 114 to cause the document 102 to be divided into a number of sections less than the threshold maximum.

In some implementations, the section module 116 may include one or more machine learning modules. For example, the section module 116 may include a neural network, convolutional neural network (CNN), deep convolutional neural network (DCNN), and so forth. The section module 116 may be trained using previous documents 102 and sections of documents 102 that were determined based on characteristics of the documents 102, as well as feedback associated with documents 102 that were provided in responses 108. For example, the section data 118 may be determined based at least in part using machine learning techniques, which may determine, based on historical data, characteristics of a document 102 that are more likely to be suitable for dividing a document 102 into sections that are useful and relevant when provided in a response 108.

After dividing the first document 102(1) into sections that each include a portion 120 of the text 106 of the first document 102(1), a language module 122 associated with the server(s) 112 may determine one or more sets of values 104 that represent the determined portions 120 of the text 106. A set of values 104 that represents a portion 120 of the text 106 may represent both the text 106 itself (e.g., the words, characters, and so forth), as well as semantic characteristics, such as the arrangement of words or characters, punctuation, capitalization, spacing and other formatting characteristics, and so forth. In some implementations, the language module 122 may determine correspondence between each determined portion 120 of the text 106 and language data 124, which may associate text 106 and semantic characteristics with values 104. For example, the language module 122 may include a natural language processing module which may determine text 106 and semantic characteristics based on the first document 102(1). Continuing the example, the language module 122 may analyze the first document 102(1) to determine the semantic characteristics that are associated with the text 106 of the first document 102(1). One or more values 104 may then be determined based on the determined text 106 and semantic characteristics. In some implementations, the language module 122 may include one or more machine learning modules. For example, the language module 122 may include a neural network, convolutional neural network (CNN), deep convolutional neural network (DCNN), and so forth. The machine learning module(s) may be trained using previous documents 102 and sections of documents 102 that were provided in responses 108, parameters of queries for which documents 102 or sections of documents 102 were responsive or non-responsive, and so forth. For example, the language module 122 may determine tokens that represent the words within the first portion 120(1). Based on correspondence between the language data 124 and the tokens, the arrangement of the tokens, and other semantic characteristics of the first portion 120(1), the language module 122 may determine one or more first values 104(1). The first value(s) 104(1) may represent the first text 106(1) included in the determined first portion 120(1), and the semantic characteristics of the first text 106(1). In a similar manner, the language module 122 may determine one or more second values 104(2) that represent the second text 106(2) included in the second portion 120(2), and the semantic characteristics of the second text 106(2). In some implementations, the value(s) 104 may include an embedding vector in a semantic space. For example, a vector may indicate a point in an n-dimensional space that corresponds to particular words or semantic characteristics of the text 106 represented by the vector. Use of vector representations may enable similarity between different text 106 to be determined based on a distance between the points indicated by vectors that represent the different text 106.

While FIG. 1 depicts a single document 102(1) and two sets of values 104 determined based on two sections of the document 102(1), any number of documents 102 may be divided into sections, and any number of sets of values 104 may be determined for each section of each document 102. For example, a data store associated with a company or other organization may include multiple documents 102. Each document 102 may be divided into sections, as described previously, and stored in association with data indicating the particular text 106 included in each section. Additionally, each document 102 may be stored in association with a set of values 104 that represent the text 106 and semantic characteristics of each section. For example, a document 102 may include one or more instances of Example Code 1 below:

```
{
...,
passages: [
   {'startAt': int1,
   'endAt': int2
   'embedding':[X], ...
   }
]
...,
}
```

Example Code 1

In Example Code 1 above, "int1" may represent a character index value where a determined section of a document 102 begins, and "int2" may represent a character index value where the determined section of the document 102 ends. The value "X" may represent a vector or other set of values 104 that represent the text 106 and semantic characteristics of the text 106 within the determined section.

In some implementations, if the first document 102(1) is modified, such as through the addition, removal, or modification of text 106, the process described above may be repeated with regard to the modified text 106 of the first document 102(1). For example, the first document 102(1) may be divided into sections based on correspondence between the modified text 106 and the section data 118, and one or more values 104 may be determined for each resulting section. In some implementations, the process of determining sections and values 104 that represent the first document 102(1) in response to a modification may be performed if at least a threshold portion of text 106 associated with the first document 102(1) is added, removed, or modified.

At a second time T2, after one or more sets of values 104 representing a section of the first document 102(1) have been determined, a query 126 may be received. For example, FIG. 1 depicts a user device 128 providing a query 126 to the server(s) 112. The user device 128 may include any type of computing device including, without limitation, a personal computing device, a mobile or portable computing device, a wearable or embedded computing device, a vehicle-based computing device, a set top box, one or more servers, and so forth. The query 126 may include third text 106(3). For example, FIG. 1 depicts the query 126 as a question expressed in natural language: "How do I set up my e-mail account?" In addition to the words of the query 126, the third text 106(3) may include semantic characteristics, such as the arrangement of words, punctuation, capitalization, meaning of words, and so forth.

The language module 122 associated with the server(s) 112 may receive the query 126. In some implementations, based on the language data 124, the language module 122 may generate an augmented query based on the received query 126, such as by adding or removing one or more words. For example, the language data 124 may associate various keywords or other parameters of queries with weight values. Continuing the example, words that are unlikely to indicate the nature of a received query 126 may be assigned a low weight value, or a weight value of zero, and such words may be disregarded or omitted from an augmented query. Conversely, words that are likely to indicate the nature of the received query 126 or words that are less likely to be included in a large number of other queries may be assigned a high weight value. In some implementations, semantic characteristics, such as the arrangement, punctuation, formatting, and so forth of particular words within the received query 126 may also be assigned a weight value. In some implementations, the language data 124 may indicate one or more synonyms associated with particular words within the received query 126. For example, the language data 126 may indicate the terms "Install" and "Configure" are synonyms for the term "Set Up", and the terms "Mail" and "Message" are synonyms for the term "E-mail". When determining a section of a document 102 that corresponds to the received query 126, the determined synonyms may also be used to locate corresponding materials for inclusion in the response 108.

The language module 122 may determine one or more third values 104(3) based on the language data 124 and the third text 106(3) and semantic characteristics of the query 126. For example, the language module 122 may determine tokens that represent the words within the third text 106(3).

Based on correspondence between the language data 124 and the tokens, the arrangement of the tokens, and other semantic characteristics of the third text 106(3), the language module 122 may determine one or more third values 104(3) that represent the third text 106(3) of the query 126 and the semantic characteristics of the third text 106(3). In some implementations, the third value(s) 104(3) may include a vector embedding in a semantic embedding space. For example, the vector may indicate a point in an n-dimensional space that corresponds to particular words or semantic characteristics of the text 106(3) of the query 126 that is represented by the vector. Use of vectors to represent queries 126 and sections of documents 102 may enable similarity between the third text 106(3) of the query 126 and text 106 of one or more documents 102 to be determined based on a distance between points indicated by vectors.

A comparison module 130 associated with the server(s) 112 may determine documents 102 that correspond to a received query 126 and particular sections of a document 102 that may be relevant to the text 106(3) of the query 126. In some implementations, the comparison module 130 may determine correspondence between the text 106 of one or more documents 102 and the third text 106(3) of the query 126 to determine one or more documents 102 that may be relevant to the query 126. Then, the values 104 that represent the text 106 for different sections of the documents 102 may be compared to the third value(s) 104(3) that represent the third text 106(3) and semantic characteristics of the query 126 to determine a set of values 104 within a threshold similarity of the third value(s) 104(3). Values 104 that are within a threshold similarity of the third value(s) 104(3) may correspond to text 106 that is responsive to the query 126. In other implementations, the comparison module 130 may compare the values 104 determined for one or more sections of documents 102 with the third values 104(3) that represent the third text 106(3) and semantic characteristics of the query 126 to determine a set of sections of documents 102 that may be relevant to the query 126. Then, correspondence between the third text 106(3) and the text 106 of the determined documents 102, and in some cases, user feedback, scores, or other characteristics of the documents 102 may be used to determine a particular document 102 for use in a response 108.

For example, the comparison module 130 may generate a document determination 132 indicative of one or more documents 102 that correspond to the query 126. Specifically, based on correspondence between the first text 106(1) of the first portion of the first document 102(1), and the third text 106(3) of the query 126, the comparison module 130 may indicate the first document 102(1) in the document determination 132. Continuing the example, if at least a threshold portion of the first text 106(1) at least partially matches the third text 106(3), or an augmented query generated based on the third text 106(3), this may indicate that the first document 102(1) is relevant to the query 126.

The comparison module 130 may also generate a section determination 134 indicative of one or more sections of a document 102 that correspond to the third text 106(3) of the query 126. For example, the comparison module 130 may compare the third value(s) 104(3) that represent the third text 106(3) and semantic characteristics of the third text 106(3) to the first value(s) 104(1) and the second value(s) 104(2). In some implementations, comparison of sets of values 104 may include determining a distance between vectors or whether the vectors that represent a query 126 and a section of a document 102 are within a threshold similarity. In other implementations, sets of values 104 may be compared by determining whether at least a portion of the values 104 within a set of values 104 is within a threshold value of at least a portion of the values 104 within another set of values 104. For example, the section determination 134 of FIG. 1 may indicate that the first value(s) 104(1) that represent the first text 106(1) are within a threshold of the third value(s) 104(3) that represent the third text 106(3) of the query 126. Continuing the example, because both the first text 106(1) and the third text 106(3) include similar verbiage, such as the words "set up" followed by "e-mail account", the first value(s) 104(1) representing the first text 106(1) may be similar to the third value(s) 104(3) representing the third text 106(3). Because the second text 106(2) is dissimilar to the third text 106(3), the second values 104(2) may be dissimilar to the third values 104(3) that represent the query 126.

Based on the document determination 132 and the section determination 134, a response module 136 associated with the server(s) 112 may determine a response 108 to be provided to the user device 128. The response 108 may include a document indication 138 that indicates the first document 102(1) that corresponds to the query 126. For example, the document indication 138 may include a link that may be used to access the first document 102(1), a title or other identifier associated with the first document 102(1), and so forth. The response 108 may also include at least a portion of the first text 106(1) that is included in the section represented by the first value(s) 104(1) that correspond to the third value(s) 104(3). For example, in some cases, the response 108 may include the text 106 from a corresponding section of a document 102, or a portion of the text 106 from the corresponding section, which may enable a user associated with the user device 128 to determine an answer to the query 126 without navigating to the document 102. The link or other information presented in the document indication 138 may enable a user associated with the user device 128 to access the document 102 to determine additional information beyond what is included in the text 106 of the response 108.

Figure 2:
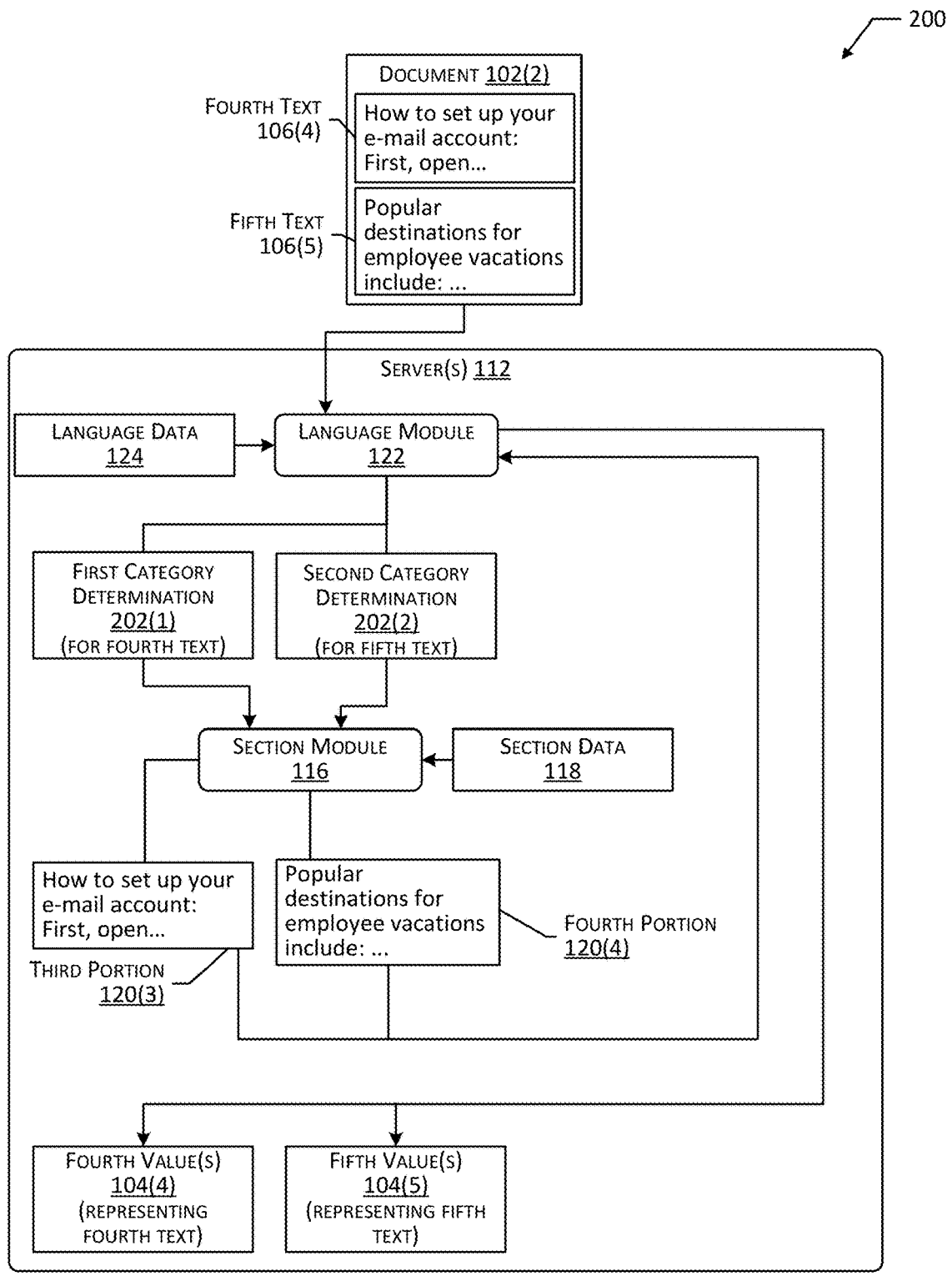
FIG. 2 is a diagram depicting an implementation of a system for dividing a document into sections based on determined categories associated with portions of the text within the document.

FIG. 2 is a diagram 200 depicting an implementation of a system for dividing a document 102 into sections based on determined categories associated with portions of the text 106 within the document 102. Specifically, FIG. 2 depicts a second document 102(2) that includes fourth text 106(4) that includes instructions directing a user to set up an e-mail account, and fifth text 106(5) relating to destinations for employee vacations. In FIG. 2, the depiction of the text 106 of the second document 102(2) as fourth text 106(4) and fifth text 106(5) is conceptual, for illustrative purposes, and the second document 102(2) may not necessarily include a visible or conceptual separation between the fourth text 106(4) and the fifth text 106(5).

One or more servers 112, or other types of computing devices, may access the second document 102(2). A language module 122 associated with the server(s) 112 may determine correspondence between the text 106 of the second document 102(2) and language data 124. For example, the language module 122 may use natural language processing techniques or other methods to parse the text 106 of the second document 102(2), and the language data 124 may include rules, algorithms, dictionaries, and so forth that may be used for this purpose. In some implementations, the language module 122 may include one or more neural networks (e.g., a CNN or DCNN) or other types of machine learning algorithms that may determine similar or different meanings of words or groupings of words, synonyms of words, and so forth, based on the words of a document 102 and the arrangement or other semantic characteristics of the words. Based on the fourth text 106(4) and the language data 124, the language module 122 may generate a first category determination 202(1) indicative of a category, topic, subject of the fourth text 106(4), or a portion of the fourth text 106(4) determined to be representative of the fourth text 106(4). Based on the fifth text 106(5) and the language data 124, the language module 122 may generate a second category determination 202(2) indicative of a category, topic, subject of the fifth text 106(5), or a portion of the fifth text 106(5) determined to be representative of the fifth text 106(5).

A section module 116 associated with the server(s) 112 may divide the second document 102(2) into sections based on the category determinations 202 for the text 106 of the second document 102(2). For example, section data 118 may indicate particular category determinations 202 that may cause different text 106 to be included in the same section of a document 102 or separated into different sections. Continuing the example, based on the fourth text 106(4) and the fifth text 106(5) being associated with different categories, as indicated in the first category determination 202(1) and the second category determination 202(2), the section module 116 may divide the second document 102(2) into two sections. Specifically, FIG. 2 depicts the section module 116 determining a third portion 120(3) of the second document 102(2) that includes the fourth text 106(4), and a fourth portion 120(4) of the second document 102(2) that includes the fifth text 106(5). While FIG. 2 depicts determination of two sections of the second document 102(2), a document 102 may be divided into any number of sections. In some implementations, as described with regard to FIG. 1, the section data 118 may include threshold data indicative of a minimum or maximum number of sections that may be determined for a document 102. In some cases, the threshold minimum or maximum number of sections may be determined based in part on one or more characteristics of the document 102. For example, a document 102 that includes a large amount of text 106 may be associated with a larger threshold maximum number of sections than a document 102 that includes a smaller amount of text 106.

After dividing the second document 102(2) into sections that each include a portion 120 of the text 106 of the second document 102(2), the language module 122 may determine one or more sets of values 104 that represent the determined portions 120 of the text 106. The determined sets of values 104 may represent both the text 106 of a section of the second document 102(2) (e.g., the words, characters, and so forth), as well as semantic characteristics, such as the arrangement of words or characters, punctuation, capitalization, spacing and other formatting characteristics, and so forth. In some implementations, the language module 122 may determine tokens that represent the words within the third portion 120(3) and the fourth portion 120(4). Based on the arrangement of the tokens and other semantic characteristics, the language module 122 may determine one or more fourth values 104(4) that represent the fourth text 106(4) included in the determined third portion 120(3), and the semantic characteristics of the fourth text 106(4). In a similar manner, the language module 122 may determine one or more fifth values 104(5) that represent the fifth text 106(5) included in the fourth portion 120(4), and the semantic characteristics of the fifth text 106(5). In some implementations, the value(s) 104 may include an embedding vector in a semantic embedding space.

As described with regard to FIG. 1, the determined value(s) 104 may be stored in association with the second document 102(2), which may include an indication of the determined sections and the corresponding value(s) 104 for each determined section. Additionally, as described with regard to FIG. 1, at a subsequent time, a query 126 may be received, processed by the language module 122 to determine one or more values 104 that represent the text 106 and semantic characteristics of the query 126, and the value(s) 104 that represent the query 126 may be compared to the value(s) 104 that represent the sections of the second document 102(2), and in some cases with value(s) 104 associated with one or more other documents 102.

Figure 3:
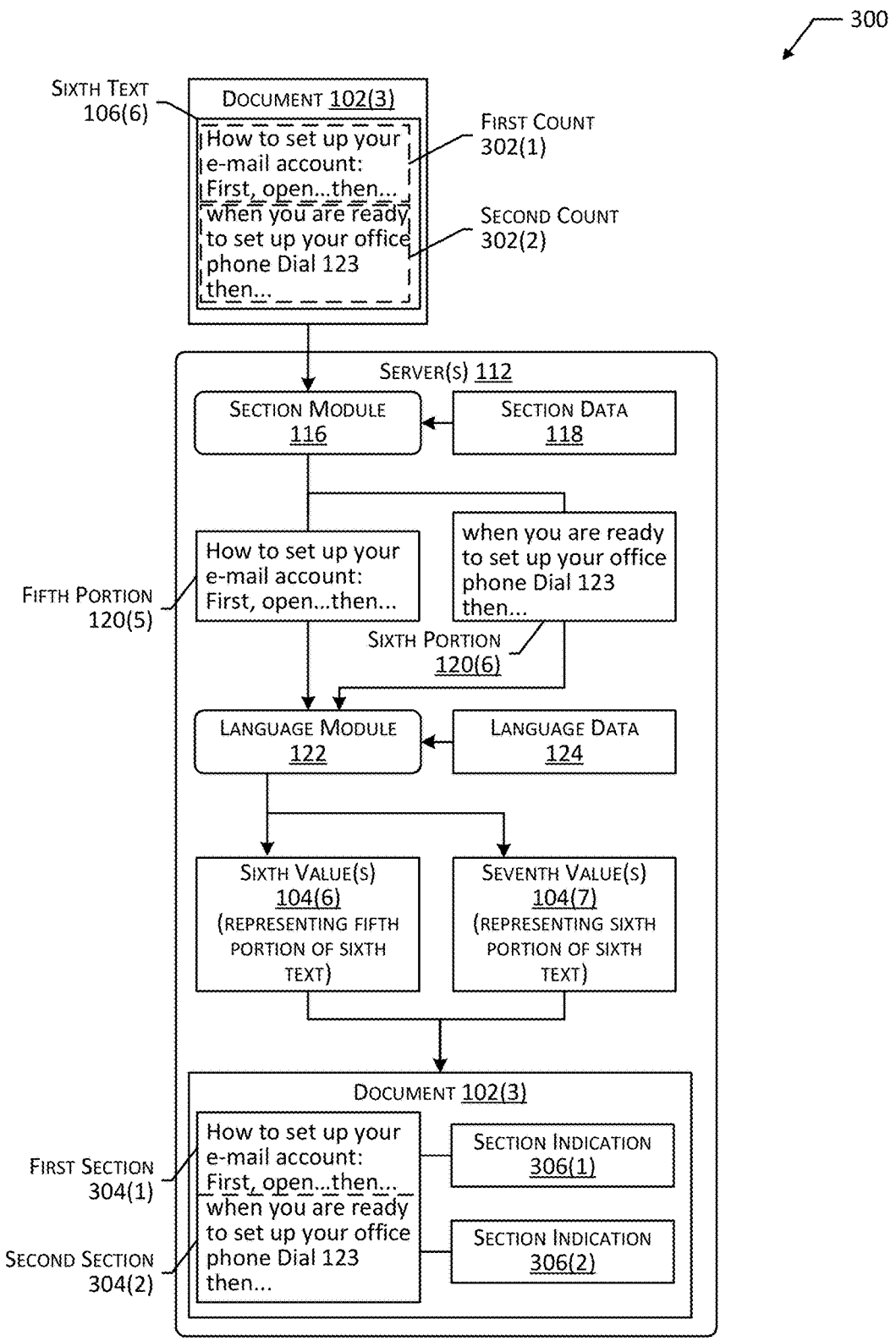
FIG. 3 is a diagram depicting an implementation of a system for dividing a document into sections based on determined amounts of text or other content within the document and within each determined section.

FIG. 3 is a diagram 300 depicting an implementation of a system for dividing a document 102 into sections based on determined amounts of text 106 or other content within the document 102 and within each determined section. For example, FIG. 3 depicts a third document 102(3) that includes sixth text 106(6). In some cases, the text 106 of a document 102 may not include text characteristics 114, categories, or other properties that may be used to divide the document 102 into sections. For example, the section data 118 may indicate one or more text characteristics 114 or other properties for determining sections of a document 102, but the third document 102(3) may not include properties that correspond to the section data 118. In such a case, the third document 102(3) may be divided based on quantities of text 106 or other content. For example, FIG. 3 depicts the sixth text 106(6) of the third document 102(3) including a first count 302(1) of text 106 and a second count 302(2) of text 106. The counts 302 of text 106 may include quantities of words, characters, sentences, or other groupings of words or characters. In FIG. 3, the depiction of the sixth text 106(6) having the first count 302(1) and the second count 302(2) is conceptual, for illustrative purposes. In some implementations, the third document 102(3) may not include a visible or conceptual separation between the first count 302(1) and the second count 302(2) of text 106.

The section module 116 associated with the server(s) 112 may determine correspondence between the sixth text 106(6) and section data 118. As described with regard to FIG. 1, in some implementations, the section data 118 may indicate one or more threshold characters, which may include selected characters or groups of characters, code, or other text characteristics 114 that may be used to divide the first document 102(1) into sections. As described with regard to FIG. 2, in some implementations, the section data 118 may indicate particular category determinations 202 that may cause different text 106 to be included in the same section of a document 102 or separated into different sections. In other implementations, the section data 118 may indicate counts of words, characters, sentences, or other groupings of words or characters. For example, the section data 118 may indicate a threshold minimum, maximum, or target length of a section. Based on the section data 118, the third document 102(3) may be divided into sections 304 that include a count of words, characters, or sentences less than a threshold maximum, greater than a threshold minimum, or within a threshold value of a target count indicated in the section data 118.

In some implementations, as described with regard to FIGS. 1 and 2, the section data 118 may include threshold data indicative of a minimum or maximum number of sections that may be determined for a document 102. In some cases, the threshold minimum or maximum number of sections may be determined based in part on the length (e.g., amount of text 106) within a document 102 or one or more other characteristics of the document 102. In some implementations, the threshold amount of text 106 included within a section of a document 102 may be determined based in part on the characteristic(s) of the document 102 and a threshold count of sections associated with the document 102. For example, if a threshold count of sections for a document 102 is ten, a threshold amount of text 106 to be included in a section may be any amount within a threshold value of one tenth the amount of text 106 in the document 102.

FIG. 3 depicts the section module 116 determining a fifth portion 120(5) of the sixth text 106(6) that includes the first count 302(1) of the sixth text 106(6). FIG. 3 also depicts the section module 116 determining a sixth portion 120(6) of the sixth text 106(6) that includes the second count 302(2) of the sixth text 106(6). In some implementations, combinations of the techniques described with regard to FIGS. 1-3 may be used to divide a document 102 into sections. For example, a separation between a first section and a second section may be determined based on a text characteristic 114, while a separation between a third section and a fourth section may be determined based on a quantity of text.

After dividing the third document 102(3) into sections 304 that each include a portion 120 of the sixth text 106(6), the language module 122 associated with the server(s) 112 may determine one or more sets of values 104 that represent the determined portions 120 of the text 106. As described with regard to FIGS. 1 and 2, the value(s) that represent a portion 120 of the sixth text 106(6) may represent both the text 106 itself (e.g., the words, characters, and so forth), as well as semantic characteristics, such as the arrangement of words or characters, punctuation, capitalization, spacing and other formatting characteristics, and so forth. In some implementations, the language module 122 may determine correspondence between the determined portions 120 of the sixth text 106(6) and language data 124, which may associate text 106 and semantic characteristics with values 104. Additionally, in some implementations, the language module 122 may determine tokens that represent the words within the determined portions 120, and based on correspondence between the language data 124 and the tokens, the arrangement of the tokens, and other semantic characteristics, the language module 122 may determine value(s) 104 that correspond to each determined portion 120. In some implementations, a set of values 104 may include an embedding vector in a semantic embedding space. For example, a vector may indicate a point in an n-dimensional space that corresponds to particular words or semantic characteristics.

Specifically, FIG. 3 depicts the language module 122 determining one or more sixth values 104(6) that represent the first count 302(1) of the sixth text 106(6) and the semantic characteristics of the first count 302(1), and one or more seventh values 104(7) that represent the second count 302(2) of the sixth text 106(6) and the semantic characteristics of the second count 302(2). While FIG. 3 depicts a single document 102(3) and two sets of values 104 determined based on two sections 304 of the document 102(3), any number of documents 102 may be divided into any number of sections 304, and any number of sets of values 104 may be determined for each section 304 of each document 102. After dividing the third document 102(3) into a first section 304(1) that includes the fifth portion 120(5) of the sixth text 106(6) and a second section 304(2) that includes the sixth portion 120(6) of the sixth text 106(6), section indications 306 may be added to the third document 102(3). For example, as described with regard to FIG. 1, code or other types of data or metadata that indicate a portion 120 of the sixth text 106(6) that is included within a section 304 may be incorporated into the third document 102(3). Specifically, FIG. 3 depicts a first section indication 306(1) associated with the first section 304(1) of the third document 102(3) and a second section indication 306(2) associated with the second section 304(2) of the third document 102(3).

Figure 4:
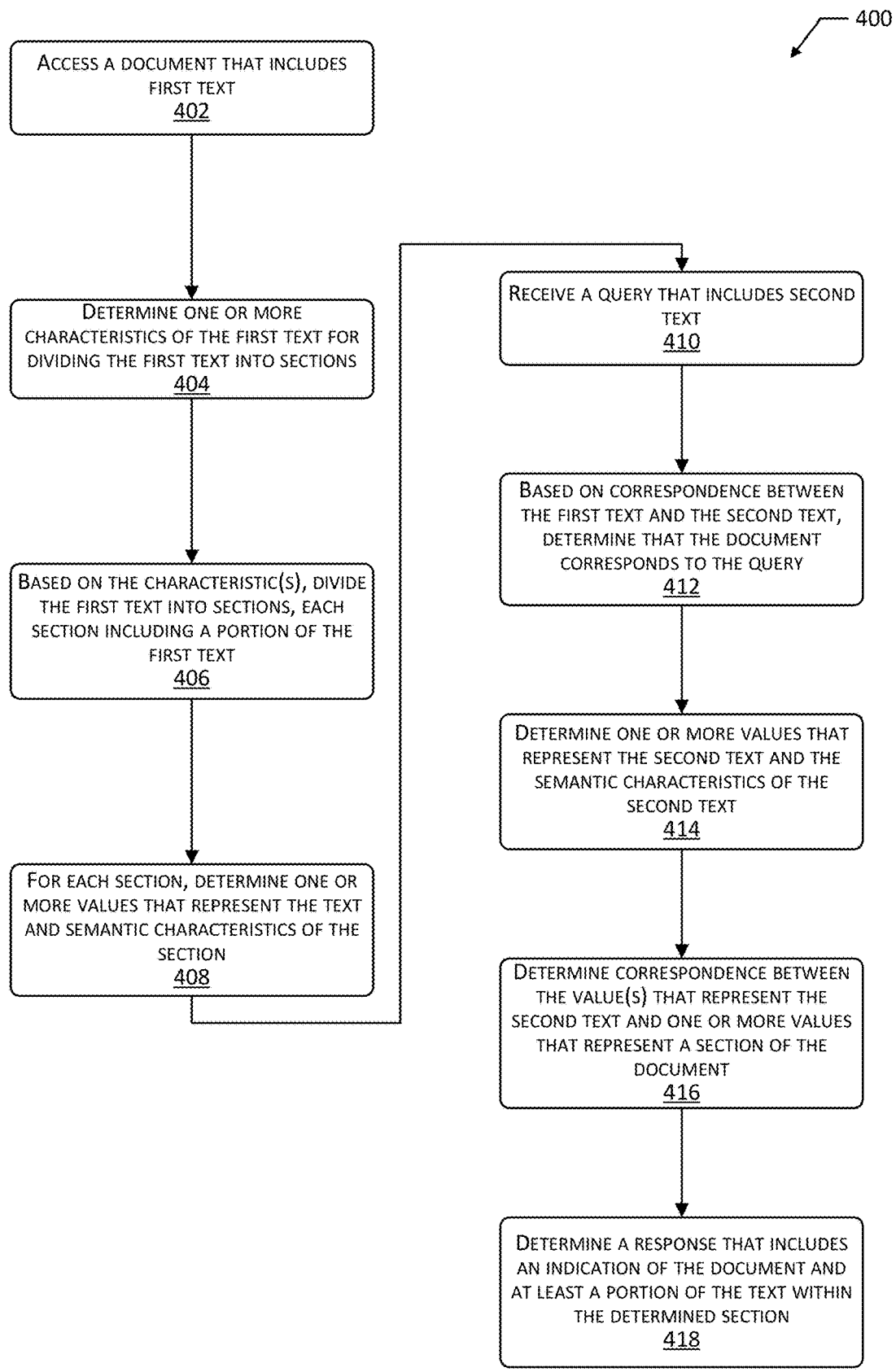
FIG. 4 is a flow diagram illustrating an implementation of a method for dividing a document into sections, determining values that represent the text and semantic characteristics of the sections, and determining a response to a query.

FIG. 4 is a flow diagram 400 illustrating an implementation of a method for dividing a document 102 into sections 304, determining values 104 that represent the text 106 and semantic characteristics of the sections 304, and determining a response 108 to a query 126. At 402, a document 102 that includes first text 106 may be accessed. For example, the document 102 may be stored in data storage accessible to one or more servers 112 or other computing device(s). As another example, the document 102 may be sent to the server(s) 112 or other computing device(s) by another computing device or input to the server(s) 112 or other computing devices, such as by a user. The document 102 may include a format associated with any type of word processing or documentation processing software. In some implementations, the document 102 may include text 106, Hypertext Markup Language (HTML), Extensible Markup Language (XML), Portable Document Format (PDF) files, and so forth. Additionally, in some implementations, in addition to text 106, the document 102 may include one or more of image data, audio data, video data, or other types of data. The text 106 of the document 102 may also include semantic characteristics, such as an arrangement of words within the text 106, punctuation, characters that represent numerals or capitalization, and so forth.

At 404, one or more characteristics of the first text 106 of the document 102 may be determined for dividing the first text 106 into sections. Characteristics that may be used to divide the text 106 of a document 102 into sections may include the presence of one or more selected characters or groups of characters, code, formats, or other characteristics. For example, a characteristic for dividing a document 102 into sections may include a paragraph break, an amount of space greater than a threshold amount, or a punctuation character (such as a bullet point or semicolon), and so forth. Continuing the example, a document 102 may be divided into sections by including a portion 120 of the text 106 that precedes a threshold character in a first section 304 and a portion 120 of the text 106 that follows the threshold character in a different section. In other implementations, a characteristic that may be used to divide the document 102 may include a category, topic, or subject associated with the text 106 within the section. For example, natural language processing or other techniques may be used to determine categories associated with different portions 120 of the text 106 of the document 102. Portions 120 of the text 106 that are associated with different categories may be separated into different sections. In still other implementations, a characteristic that may be used to divide the document 102 may include a quantity of text 106. For example, a document 102 may be divided into sections based on a threshold minimum, maximum, or target quantity of text 106 to be included in each section.

At 406, based on the determined characteristic(s), the first text 106 of the document 102 may be divided into sections 304. Each section 304 may include a portion 120 of the first text 106, and the text 106 within each section 304 may include semantic characteristics. A document 102 may include any number of sections 304. In some implementations, the number of sections 304 into which a document 102 is divided may be based on a threshold minimum, maximum, or target number of sections 304.

At 408, for each section 304, one or more values 104 may be determined. The value(s) 104 for a section 304 may represent the text 106 and semantic characteristics of the section 304. A set of values 104 that represents a portion 120 of the text 106 of a document may represent both the text 106 itself (e.g., the words, characters, and so forth), as well as semantic characteristics, such as the arrangement of words or characters, punctuation, capitalization, spacing and other formatting characteristics, meaning of words, and so forth. In some implementations, tokens for one or more words in the text 106 may be determined, and value(s) 104 that represent the tokens, the arrangement of the tokens, and other semantic characteristics may be determined. In some implementations, the value(s) 104 may include an embedding vector in a semantic embedding space that represents a section 304 of a document 102. For example, the vector may indicate a point in an n-dimensional space that corresponds to particular words or semantic characteristics of the text 106 represented by the vector. Use of vector representations may enable similarity between different text 106 to be determined based on a distance between points indicated by vectors that represent the different text 106.

At 410, a query 126 that includes second text 106 may be received. In some implementations, receipt of the query 126 may include accessing the query 126 in data storage accessible to one or more servers 112 or other types of computing devices. In other implementations, a query 126 may be sent to the server(s) 112 or other computing device(s) by another computing device. In still other implementations, the query 126 may be input to the server(s) 112 or other computing devices. The text 106 of the query 126 may include a question or phrase expressed in natural language, one or more keywords, and so forth. In some implementations, the query 126 may include other types of data, such as audio data, video data, image data, and so forth. For example, a query 126 may include audio data indicative of a question spoken by a user, captured using one or more microphones. Speech to text techniques may be used to determine text 106 based on the audio data.

At 412, based on correspondence between the first text 106 (of the document 102) and the second text 106 (of the query 126), a determination may be made that the document 102 corresponds to the query 126. For example, the text 106 of one or more documents 102 may be compared to the text 106 of the query 126. If at least a threshold portion of the text 106 of the document 102 at least partially matches text 106 of the query 126, or in some implementations, the text 106 of an augmented query generated by adding or removing terms from the query 126 based on language data 124, this may indicate that the document 102 is relevant to the query 126.

At 414, one or more values 104 that represent the second text 106 of the query 126 and the semantic characteristics of the second text 106 may be determined. For example, the query 126 may be analyzed to determine one or more values 104 in a similar manner to the analysis performed with regard to the sections 304 of the document 102. Continuing the example, a set of values 104 that represents the text 106 of the query 126, as well as semantic characteristics, may include a vector representation, or other types of values 104.

At 416, correspondence between the value(s) 104 that represent the second text 106 of the query 126 and one or more values 104 that represent a section of the document 102 may be determined. In some implementations, comparison of sets of values 104 may include determining a distance between points indicated by vectors, or whether a vector that represents a query 126 is within a threshold distance or similarity of a vector that represents a section 304 of a document 102. In other implementations, sets of values 104 may be compared by determining whether at least a portion of the values 104 that represent the query 126 are within a threshold value of at least a portion of the values 104 that represent a section 304 of the document 102.

At 418, a response 108 may be determined. The response 108 may include an indication of the determined document 102 and at least a portion of the text 106 within the determined section 304 of the document 102. For example, a response 108 may include a link, title, or other identifying information indicative of the document 102. The response 108 may also include all or a portion of the text 106 from the determined section 304, which may enable a user to determine information applicable to the query 126 without necessarily navigating to or locating the document 102.

Figure 5:
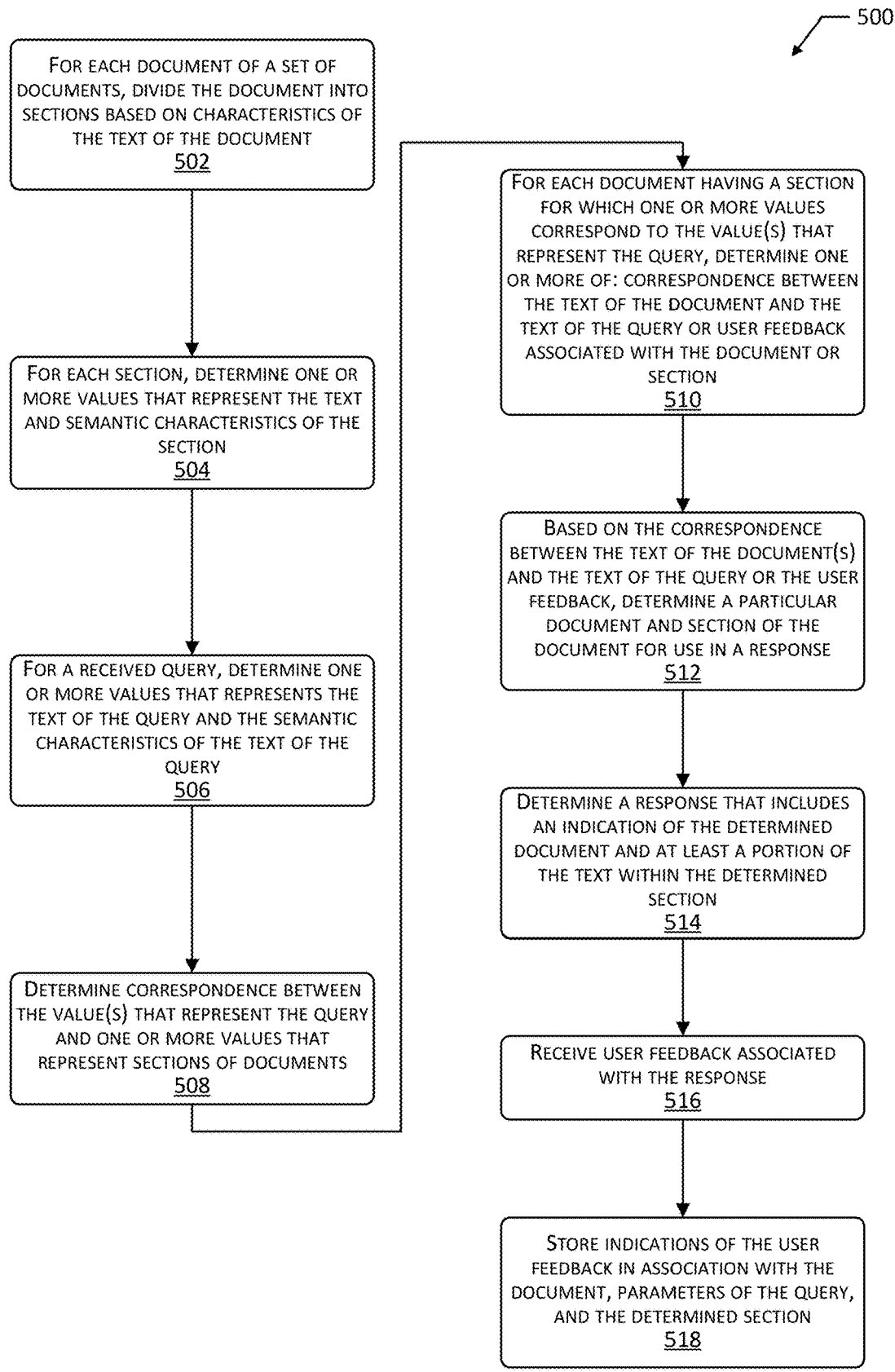
FIG. 5 is a flow diagram illustrating an implementation of a method for dividing a document into sections, determining values that represent the text and semantic characteristics of the sections, and determining a response to a query based in part on user feedback.

FIG. 5 is a flow diagram 500 illustrating an implementation of a method for dividing a document 102 into sections 304, determining values 104 that represent the text 106 and semantic characteristics of the sections 304, and determining a response 108 to a query 126 based in part on user feedback. At 502, for each document 102 of a set of documents 102, the document 102 may be divided into sections 304 based on characteristics of the text 106 of the document 102. For example, as described with regard to FIGS. 1-4, a document 102 may be divided into sections 304 based on particular text 106 (e.g., a particular character or set of characters) indicated in section data 118, an amount of space greater than a threshold, HTML code, and so forth. In other implementations, a document 102 may be divided into sections 304 based on categories associated with different portions 120 of the text 106. In still other implementations, a document 102 may be divided into sections 304 based on quantities of text 106 in the document 102 and in each section 304.

At 504, for each determined section 304, one or more values 104 that represent the text 106 and semantic characteristics of the section 304 may be determined. As described with regard to FIGS. 1-4, in some implementations, tokens for one or more words in the text 106 of the sections 304 may be determined, and value(s) 104 that represent the tokens, the arrangement of the tokens, and other semantic characteristics may be determined. In some implementations, the value(s) 104 for a section 304 may include an embedding vector in a semantic embedding space that represents the text 106 and semantic characteristics of the section 304. For example, a vector may indicate a point in an n-dimensional space that corresponds to particular words or semantic characteristics. Use of vector representations may enable similarity between different text 106 to be determined based on a distance between points indicated by vectors for the different text 106.

At 506, for a received query 126, a one or more values 104 that represent the text 106 of the query 126 and the semantic characteristics of the text 106 of the query 126 may be determined. For example, a vector or other type of value(s) 104 may be determined based on the text 106 of the query 126 and the arrangement, punctuation, capitalization, format, or other semantic characteristics of the text 106.

At 508, correspondence between the value(s) 104 that represent the query 126 and one or more values 104 that represent sections 304 of documents 102 may be determined. For example, vectors that represent of sections 304 of documents 102 that are within a threshold distance or threshold similarity of a vector that represents the query 126 may be determined. In other implementations, value(s) 104 that represent sections 304 of documents 102 that are within a threshold value of at least a portion of the value(s) 104 that represent the query 126 may be determined. Correspondence between the value(s) 104 that represent the query 126 and those that represent sections 304 of documents 102 may indicate that the corresponding sections 304 of documents 102 include text 106 and semantic characteristics that are similar to the text 106 and semantic characteristics of the query 126.

At 510, for each document 102 having a section 304 for which one or more values 104 correspond to the value(s) 104 that represent the query 126, correspondence between the text 106 of the document 102 and the text 106 of the query 126 may be determined. Alternatively or additionally, user feedback associated with the document 102 or section 304 may be determined. For example, if multiple sections 304 of documents 102 are represented by values 104 within a threshold value of the value(s) 104 that represent the query 126, correspondence between the text 106 of the documents 102 in which the sections 304 are included and the text 106 of the query 126 may be used to determine a particular section 304 that may have greater relevance or be more suitable for use in a response 108. Additionally, documents 102 or sections 304 of documents 102 associated with greater positive user feedback, or a smaller quantity of negative user feedback, may be more suitable for use in a response 108 than other documents 102 or sections 304.

At 512, based on the correspondence between the text 106 of the document 102 and the text 106 of the query 126, or based on the user feedback, a particular document 102 and section 304 of the document 102 for use in a response 108 may be determined. At 514, a response 108 may be determined that includes an indication of the determined document 102 and at least a portion 120 of the text 106 within the determined section 304. For example, a response 108 may include a link or other type of control to access the document 102, or a name, title, or other identifying information indicative of the document 102. The response 108 may also include all or a portion 120 of the text 106 within the corresponding section 304 of the document 102.

At 516, user feedback associated with the response 108 may be received. For example, the response 108 may be presented in a user interface that includes one or more controls for receiving input indicative of user feedback. In other cases, a separate interface requesting user feedback may be presented. At 518, an indication of the received user feedback may be stored in association with the document 102 that was indicated in the response 108. An indication of the user feedback may also be stored in association with the parameters of the query 126 that was received. For example, association of the user feedback with the parameters of the query 126 may enable the types of queries 126 or types of information for which the document 102 was relevant or non-relevant to be determined. If a query 126 having similar parameters is received at a future time, the relevance or non-relevance of the document 102 to the future query may be determined based in part on the user feedback associated with the previous query parameters. An indication of the user feedback may additionally be stored in association with an indication of the section 304 of the document 102 that was included in the response 108. For example, user feedback that is associated with a particular section 304 of a document 102 may indicate the relevance or non-relevance of that section 304 with regard to the parameters of a particular query 126. However, other sections 304 of the document 102 may be relevant or non-relevant with regard to other queries.

Figure 6:
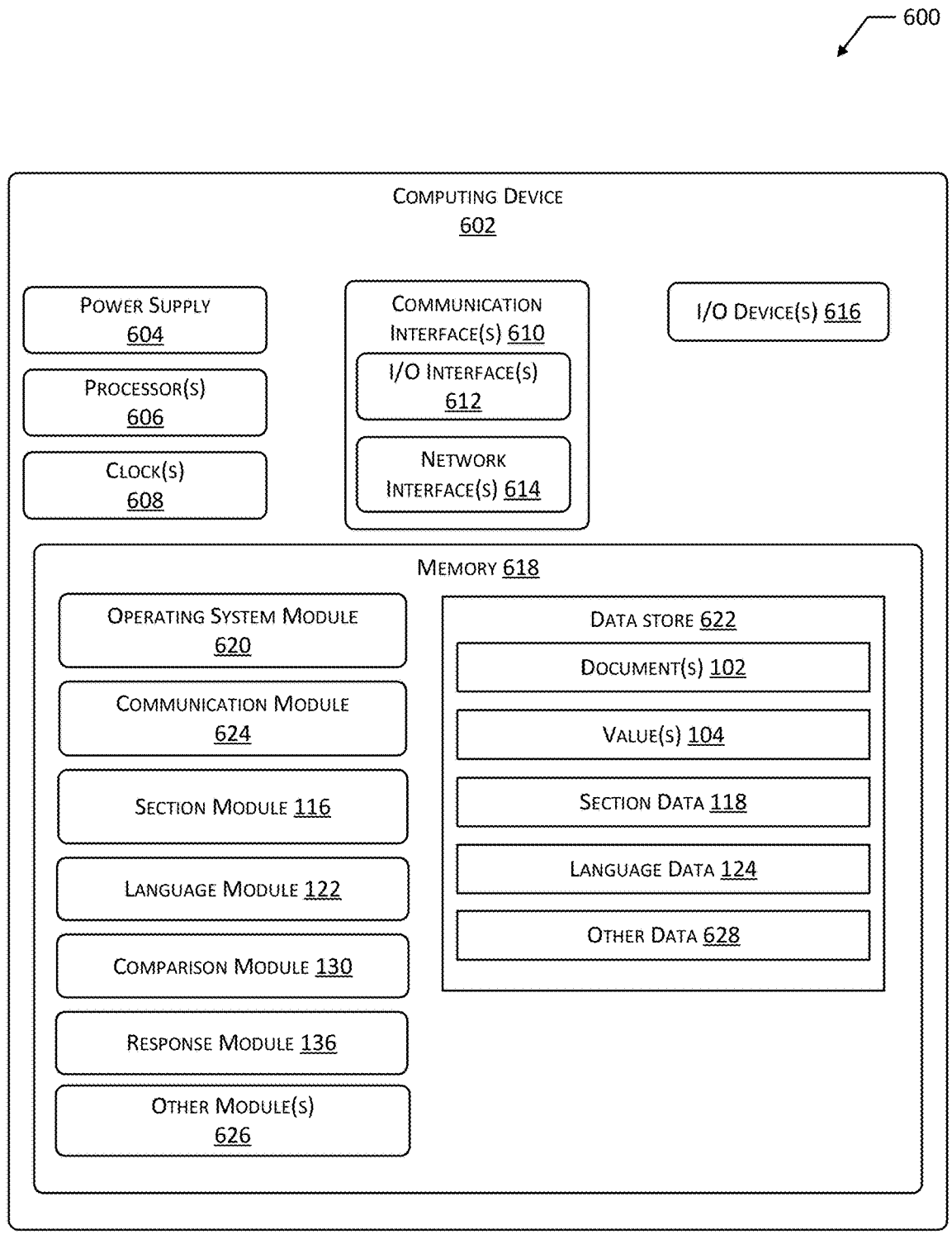
FIG. 6 is a block diagram illustrating a computing device within the present disclosure.

FIG. 6 is a block diagram 600 illustrating a computing device 602 within the present disclosure. The computing device 602 may include one or more servers 112, user devices 128, or any other computing device 602 in communication with one or more of a server 112 or user device 128. For example, any of the functions described herein with regard to the server(s) 112 and user device 128 may be performed by the server(s) 112, the user device 128, one or more other computing devices 602 in communication with one or more of the server(s) 112 or user device 128, or combinations thereof. Additionally, while FIG. 6 depicts a single block diagram 600, any number and any type of computing devices 602 may be used to perform the functions described herein.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clock(s) 608 may provide information indicative of date, time, ticks, and so forth. For example, the processor(s) 606 may use data from the clock 608 to generate a timestamp, trigger a preprogrammed action, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input devices or output devices associated with the computing device 602. For example, I/O devices 616 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 616 may be physically incorporated with the computing device 602. In other implementations, the I/O devices 616 may be externally placed. The I/O devices 616 may also include one or more sensors, that may be in direct or wireless communication with the computing device 602.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, 5G, LTE, and so forth.

The computing device 602 may include one or more buses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store the section module 116. The section module 116 may be used to divide one or more documents 102 into sections 304, each section 304 including a portion 120 of the text 106 included in the entire document 102. In some implementations, a document 102 may be divided into sections 304 based at least in part on section data 118. Section data 118 may indicate one or more selected characters or groups of characters, code, or other text characteristics 114 that may be used to divide documents 102 into sections 304. Section data 118 may also indicate categories associated with text 106 that may be used to divide documents 102 into sections 304. Section data 118 may further indicate threshold minimum, maximum, or target quantities of text 106 to be included in sections 304. In some implementations, the section data 118 may include threshold data indicative of a minimum or maximum number of sections 304 that may be determined for a document 102. In such a case, the section data 118 may include a priority value or hierarchy associated with one or more text characteristics 114 or other characteristics for dividing a document 102 into sections 304. In cases where a document 102 includes a number of characteristics that would result in the document 102 being divided into a greater number of sections 304 than a threshold maximum, the document 102 may be divided based on characteristics having a greater priority than other characteristics.

The memory 618 may also include the language module 122. The language module 122 may include one or more natural language processing, text recognition, speech recognition, speech to text, and other types of modules that may be used to analyze the text 106 within documents 102 and within queries 126. In some implementations, the language module 122 may include one or more machine learning modules, such as neural networks (e.g., CNNs or DCNNs). The language module 122 may determine one or more values 104 that represent text 106 and semantic characteristics within determined sections 304 of documents 102. The language module 122 may also determine one or more values 104 that represent text 106 and semantic characteristics of a query 126. In some implementations, the language module 122 may determine an augmented query based on the language of a received query 126 and language data 124. For example, natural language processing techniques and language data 124 indicative of particular weights applied to certain terms or semantic characteristics of the query 126, and synonyms of particular query terms, may be used to process a received query 126 by removing or adding one or more words.

The memory 618 may additionally include the comparison module 130. The comparison module 130 may determine documents 102 that correspond to a received query 126 and particular sections 304 of a document 102 that may be relevant to the query 126. In some implementations, the comparison module 130 may determine correspondence between the text 106 of one or more documents 102 and the text 106 of a query 126 to determine one or more documents 102 that may be relevant to the query 126. Then, the comparison module 130 may determine correspondence between the value(s) 104 that represent the text 106 and semantic characteristics of the query 126 and the value(s) 104 that represent the text 106 and semantic characteristics of different sections 304 of the documents 102. Based on these correspondences, the comparison module 130 may determine one or more sections 304 of documents 102 that may be included in a response 108 to the query 126. In other implementations, as described with regard to FIG. 5, the comparison module 130 may initially determine one or more sections 304 of documents 102 that correspond to a received query 126 based on the value(s) 104 that represent the query 126 and the value(s) 104 that represent the sections 304 of the documents 102. The comparison module 130 may then determine one or more particular sections 304 for use in a response 108 based on correspondence between the text 106 of the documents 102 that include the sections 304 and the text 106 of the query 102, or in other implementations, based on user feedback associated with the documents 102, sections 304, and query parameters.

The memory 618 may also include the response module 136. The response module 136 may determine a response 108 to be provided to a user device 128 or other computing device 602 associated with a query 126. The response 108 may include at least a portion 120 of the text 106 of a section 304 determined using the comparison module 130, and in some implementations, an indication of the document 102 associated with the section 304.

Other modules 626 may also be present in the memory 618. For example, other modules 626 may include permission or authorization modules to enable a user to provide authorization to send and receive data associated with the computing device 602. Other modules 626 may also include encryption modules to encrypt and decrypt communications between computing devices 602, authentication modules to authenticate communications sent or received by computing devices 602, a permission module to assign, determine, and manage user permissions to access or modify data associated with computing devices 602, and so forth. Other modules 626 may include user interface modules for receiving queries 126, presenting responses 108, and receiving user feedback. Other modules 626 may also include modules for training machine learning systems, modifying algorithms or other data associated with the machine learning systems, and so forth.

Other data 628 within the data store(s) 622 may include configurations, settings, preferences, and default values associated with computing devices 602. Other data 628 may also include encryption keys and schema, access credentials, and so forth. Other data 628 may include data regarding networks and devices that may be used to determine the manner in which communications are provided to computing devices 602. Other data 628 may also include interface data that may control the arrangement and other characteristics of user interfaces presented to receive queries 126, present responses 108, receive user feedback, and so forth.

In different implementations, different computing devices 602 may have different capabilities or capacities. For example, servers 112 may have greater processing capabilities or data storage capacity than user devices 128.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and
   one or more hardware processors to execute the computer-executable instructions to:
   access a document that includes first text;
   identify one or more characteristics of the first text;
   determine that the first text lacks one or more threshold characters;
   in response to the determination that the first text lacks the one or more threshold characters, determine one or more of: a count of characters associated with the first text, a count of words associated with the first text, or a count of sentences associated with the first text;
   based on the one or more characteristics of the first text;
      determine a first section of the document that includes a first portion of the first text having first semantic characteristics, wherein the first portion of the first text is determined for inclusion in the first section based on a threshold count and the one or more of the count of characters, the count of words, or the count of sentences; and
      determine a second section of the document that includes a second portion of the first text having second semantic characteristics;
   determine, based on the first portion of the first text and the first semantic characteristics, a first vector that represents the first portion of the first text and the first semantic characteristics;
   determine, based on the second portion of the first text and the second semantic characteristics, a second vector that represents the second portion of the first text and the second semantic characteristics;
   receive a query that includes second text having third semantic characteristics;
   determine, based on correspondence between the first text and the second text, that the document at least partially corresponds to the query;
   determine, based on the second text and the third semantic characteristics, a third vector that represents the second text and the third semantic characteristics;
   determine that the third vector is within a threshold similarity of the first vector; and
   determine a response to the query, wherein the response is indicative of the document and includes at least a portion of the first portion of the first text.

2. The system of claim 1, wherein the one or more threshold characters include one or more of a formatting character that is not associated with a display output or markup language that indicates a division between text.

3. The system of claim 1, further comprising computer-executable instructions to:
receive user input indicative of relevance of the response to the query; and
store data indicative of the user input in association with a first indication associated with the document and a second indication associated with the first section of the document.

4. The system of claim 1,
wherein the threshold count is associated with a length of a section.

5. The system of claim 1, further comprising computer-executable instructions to:
determine correspondence between the query and language data, wherein the language data is indicative of one or more of:
weights associated with at least a portion of the second text;
weights associated with at least a portion of the third semantic characteristics; or
synonyms associated with at least a portion of the second text; and
before determination of the third vector, based on the correspondence between the query and the language data, one or more of: add at least one word to the second text of the query, or remove at least one word from the second text of the query.

6. The system of claim 1, wherein one or more of the first semantic characteristics, the second semantic characteristics, or the third semantic characteristics include one or more of:
an arrangement of one or more words;
one or more characters representing punctuation;
one or more characters representing numerals; or
one or more characters representing capitalization.

7. The system of claim 1, further comprising computer-executable instructions to:
train a machine learning model using historical data, wherein the historical data comprises previous documents and corresponding identified sections of the previous documents provided in response to one or more queries, parameters for the one or more queries, and feedback associated with the previous documents and corresponding identified sections; and
determine, using the trained machine learning model, section data based on a determination of document properties likely to result in relevant sections when provided in response to the query.

8. A method comprising:
determining one or more characteristics of first text included in a document;
determining that the first text lacks one or more threshold characters;
in response to determining that the first text lacks the one or more threshold characters, determining one or more of: a count of characters associated with the first text, a count of words associated with the first text, or a count of sentences associated with the first text;
determining, based on the one or more characteristic of the first text, a first section of the document that includes a first portion of the first text, wherein the first portion of the first text is determined for inclusion in the first section based on a threshold count and the one or more of the count of characters, the count of words, or the count of sentences, and wherein the first portion includes first semantic characteristics;
determining, based on one or more of: the one or more characteristics of the first text or the determined first section, a second section of the document that includes a second portion of the first text, wherein the second portion includes second semantic characteristics;
determining one or more first values that represent the first semantic characteristics and the first portion of the first text;
determining one or more second values that represent the second semantic characteristics and the second portion of the first text;
receiving a query that includes second text having third semantic characteristics;
determining that at least a portion of the first text corresponds to at least a portion of the second text;
determining one or more third values that represent the second text and the third semantic characteristics;
determining that the one or more third values are within a threshold value of the one or more first values; and
in response to the one or more third values being within the threshold value of the one or more first values, determining a response that includes an indication of the first portion of the first text.

9. The method of claim 8, wherein the determining that the at least the portion of the first text corresponds to the at least the portion of the second text includes determining correspondence between the one or more third values and one or more of: the one or more first values or the one or more second values.

10. The method of claim 8,
wherein the one or more threshold characters include one or more of: a formatting character that is not associated with a display output or markup language that indicates a division between text.

11. The method of claim 8, further comprising:
determining that a count of sections associated with the first text is less than a threshold count of sections.

12. The method of claim 8, further comprising:
determining one or more of an addition, a removal, or a modification to at least a portion of the first text to form a modified first text;
in response to the one or more of the addition, the removal, or the modification, determining a characteristic of the modified first text;
determining, based on the characteristic of the modified first text, a third section of the document that includes a third portion of the modified first text, wherein the third portion includes fourth semantic characteristics;
determining, based on one or more of: the characteristic of the modified first text or the determined third section, a fourth section of the document that includes a fourth portion of the modified first text, wherein the fourth portion includes fifth semantic characteristics;
determining one or more fourth values that represent the fourth semantic characteristics and the third portion of the modified first text; and
determining one or more fifth values that represent the fifth semantic characteristics and the fourth portion of the modified first text.

13. The method of claim 8, further comprising:
determining a first vector that indicates a first point that corresponds to the one or more first values;
determining a second vector that indicates a second point that corresponds to the one or more second values; and determining a third vector that indicates a third point that corresponds to the one or more third values, wherein the determining that the one or more third values are within the threshold value of the one or more first values includes determining that a distance between the first point and the third point is less than a threshold distance.

14. A system comprising:

one or more memories storing computer-executable instructions; and one or more hardware processors to execute the computer-executable instructions to:

access a first document that includes first text;

identify one or more characteristics of the first text;

determine that the first text lacks one or more threshold characters;

in response to the determination that the first text lacks the one or more threshold characters, determine one or more of: a count of characters associated with the first text, a count of words associated with the first text, or a count of sentences associated with the first text;

based on the one or more characteristics of the first text:

determine a first section of the first document that includes a first portion of the first text, wherein the first portion of the first text is determined for the inclusion in the first section based on a threshold count and the one or more of the count of characters, the count of words, or the count of sentences, and wherein the first portion includes first semantic characteristics; and determine a second section of the first document that includes a second portion of the first text, wherein the second portion includes second semantic characteristics;

determine one or more first values based on the first semantic characteristics and the first portion of the first text;

determine one or more second values based on the second semantic characteristics and the second portion of the first text;

receive a query that includes second text having third semantic characteristics;

determine one or more third values based on the second text and the third semantic characteristics;

determine that the one or more third values are within a threshold value of the one or more first values; and determine a response that includes an indication of the first portion of the first text.

15. The system of claim 14, further comprising computer-executable instructions to:

include an indication of the first document in the response;

receive user input indicative of a selection of the first document; and in response to the user input, determine user interface data to cause presentation of a user interface that includes the first portion of the first text in a first region and the second portion of the first text in a second region, wherein based on the response including at least a portion of the first portion of the first text, the first region of the user interface is presented in a display area after receipt of the user input.

16. The system of claim 14, wherein the computer-executable instructions to determine the one or more first values include computer-executable instructions to:

determine a plurality of tokens that represent the first portion of the first text;

determine an arrangement associated with the plurality of tokens; and based on correspondence between the plurality of tokens, the arrangement, and language data that associates values with tokens and arrangements of tokens, determine the one or more first values that represent the first semantic characteristics and the first portion of the first text.

17. The system of claim 14, further comprising computer-executable instructions to:

before the determination that the one or more third values are within the threshold value of the one or more first values, determine that at least a portion of the first text corresponds to at least a portion of the second text.

18. The system of claim 14, further comprising computer-executable instructions to:

determine that a difference between the one or more first values and the one or more second values is greater than a threshold difference; and generate a notification indicative of the difference.

19. The system of claim 14, further comprising computer-executable instructions to:

determine a first category associated with the first portion of the first text;

determine a second category associated the second portion of the first text; and determine that the first category differs from the second category, wherein the first portion is included in the first section and the second portion is included in the second section further based on the first category differing from the second category.

20. The system of claim 14, wherein the one or more threshold characters include one or more of: a formatting character that is not associated with a display output or markup language that indicates a division between text.

21. The system of claim 14, wherein the threshold count is associated with a length of a section.

* * * * *